Aug. 31, 1937.                    D. ROBERTS ET AL                    2,091,335
                                  INSULATION MEMBERS
                                  Filed Jan. 15, 1934
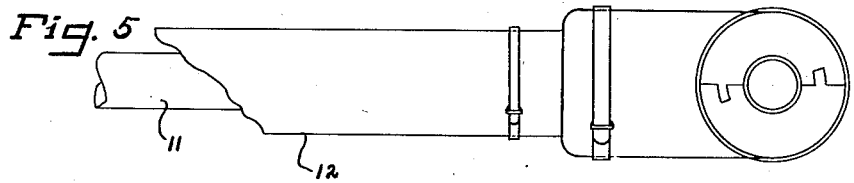
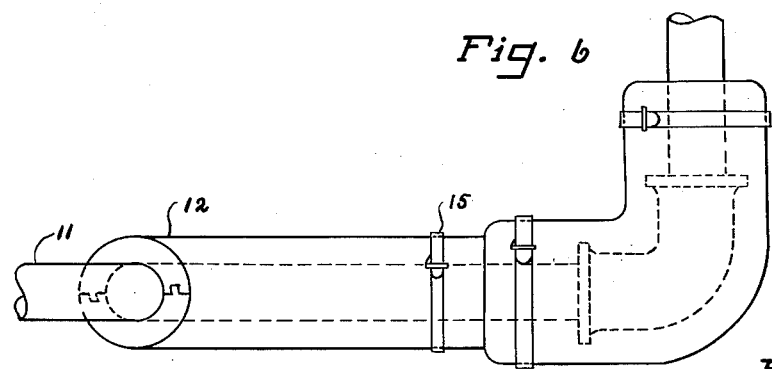
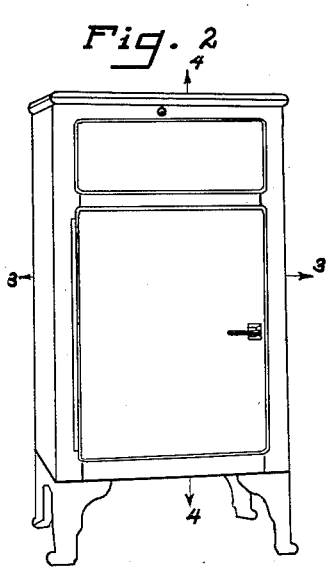 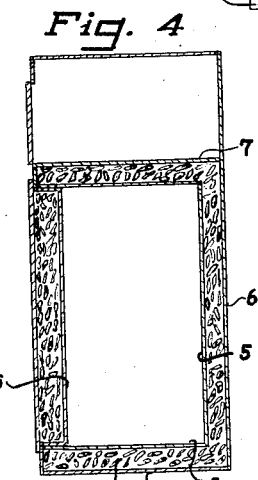 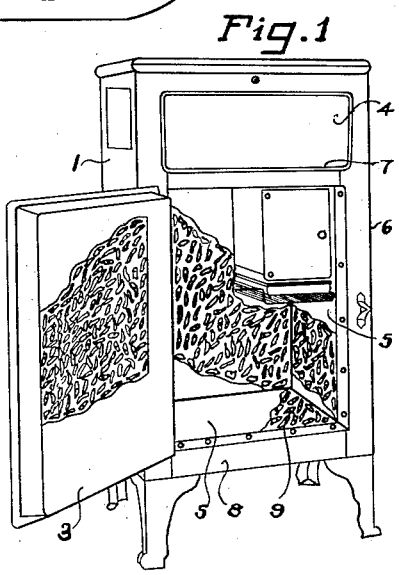
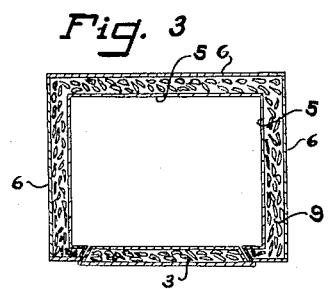
INVENTORS
Dudley Roberts
Frederick William Peel
BY
Samuel Ostrolenk
ATTORNEY.

Patented Aug. 31, 1937

2,091,335

UNITED STATES PATENT OFFICE 2,091,335

INSULATION MEMBERS

Dudley Roberts, New York, and Frederick William Peel, Yonkers, N. Y., assignors to Rubatex Products, Inc., Wilmington, Del., a corporation of Delaware Application January 15, 1934, Serial No. 706,773

3 Claims. (Cl. 220—9)

Our invention relates to insulating members, and more particularly relates to insulating members used for refrigerators, cooling systems in general, building walls, containers and the like.

Among the well-known insulation compositions used in the walls of containers, such as refrigerators, are asbestos, 85% magnesia, balsa wood, etc. Either in conjunction with these or as alternatives, it has been proposed to provide air-filled or vacuum spaces for insulation.

In fact, air spaces have long been recognized as an especially effective insulation and for this reason, various asbestos compositions, as well as other basic insulations, have been constructed, having a cellular structure, the cells comprising spaces filled with air.

We have discovered that a special preparation of rubber can be made cellular, the cells being filled with a gas selected because its heat transfer coefficient is relatively low.

The size of the cells of this rubber can be controlled to any value desired by controlling its expansion, as will be described in the following. Furthermore, the gas which is imprisoned in the cells may be selected in accordance with its insulating properties, since as will appear hereinafter, it is injected from the exterior under pressure.

This provides an insulation, the coefficient of which can be controlled over a wide range in accordance with the needs of the material.

Accordingly, an object of our invention is to provide a novel insulation for containers.

Still another object of our invention is to provide an insulation for containers whose heat coefficient can be controlled in accordance with predetermined values.

Still a further object of our invention is to provide an insulation made of an expanded rubber.

A further object of our invention is to provide an insulation comprising our novel rubber for refrigerators.

Another object of our invention is to provide a novel insulation made of our preferred rubber for pipe systems.

There are other objects of our invention which will be described in the following in connection with the drawing in which:

Figures 1 and 2 are perspective views of a refrigerator having an insulation construction in accordance with our invention;

Figure 3 is a horizontal cross section through 3—3 in Fig. 2 showing the preferred insulation imbedded in the walls of the refrigerator;

Figure 4 is a vertical cross section through 4—4 of Fig. 2 showing the preferred insulation imbedded in the walls of the refrigerator; and Figures 5 and 6 are perspective views showing the insulation applied to pipes.

Referring to the drawing, a refrigerator 1, of the usual construction, having a refrigerated chamber 2, the entrance to which is closed by a door 3, is refrigerated by the unit 4 which may be an electric motor, as in the electrical refrigerators, or may be a chemical system as in the gas refrigerators.

The details of the refrigerator, such as the expansion and contraction system and the like, are neither shown nor described as they do not form part of our invention, the principle thereof being well known to those skilled in the art.

The walls forming the chamber 2 comprise the inner walls 5 of the refrigerator, spaced from the outer side walls 6, top wall 7 and lower wall 8 by the space 9. Heat insulating substance is usually placed in this space.

In accordance with our invention, this space is filled with our rubber product, to be described in the following:

This rubber, the novel process of manufacture of which will be described below, and which contains an inert gas under high pressure, is made with the following constituents:

| | Percent. |
|---|---|
| Washed first grade crepe or smoked rubber | 40–75 |
| Sulphur | 6–30 |
| Light calcined magnesia | 3– 5 |
| Ground gilsonite | 12 |
| Lower melting bituminous substances | 12 |

In the manufacture of this product, the crepe or smoked rubber is first masticated for a period of time depending on the poundage of rubber desired. To this is added an asphalt product such as bitumin, uniformly distributed over the rubber. In order to fully impregnate the bitumin in the rubber, the mixture is taken to a dark room for a period of twenty-four hours' rest, at the end of which time it is placed on a warm mill and heated to a temperature not to exceed 100° F. to plasticize the product.

With the product in a plastic state, the sulphur, calcined magnesia and gilsonite, in proportion as stated above, are then added and the resultant mixture held inactive for a second rest period of twenty-four hours to permit thorough impregnation. The resulting dough is then taken and manufactured into various articles such as slabs, boards, etc. by means of a warming up mill or forcing machine, and then cut into desired sizes.

These are then well chalked with French chalk and placed in a container for gassing. The rubber containers are placed in an air-tight warm gassing chamber or autoclave and the air pumped out from this chamber until a substantial vacuum is produced. All the oxygen in the rubber is thus withdrawn, preventing subsequent deterioration by the action of oxygen on the rubber. This step is exceedingly important for a successful production of inflated rubber, as heretofore the failure to remove the oxygen has resulted in an early deterioration of the rubber.

Carbon dioxide, helium, nitrogen, or any non-combustible gas is then injected at a pressure which varies from an amount of 2250 pounds per square inch and up.

With the rubber still in a soft state, the gas is now injected at a high pressure and at the same time a partial vulcanization is effected to retain the injected gas. As will be described in the following, this is carried out in two steps, a partial expansion and vulcanization, followed by a complete expansion and vulcanization. This is accomplished as follows:

The pressure is increased when heat is applied by the admission of steam through a steam jacket surrounding the gassing chamber for the purpose of partially vulcanizing the soft rubber containing the injected gas. This steam jacket, which is a spiral perforated tube, encircles the inner cylinder or gassing chamber to insure uniform distribution of heat. The steam pressure applied in the heating jackets may vary from four to sixteen pounds, and the heat is applied for a period of from two hundred to six hundred minutes, depending on the physical conditions of the rubber product desired, such as the thickness of the material, weight, etc. Only partial vulcanization of the rubber has been accomplished up to this point.

The apparatus is now cooled either by permitting it to normally cool down, or by artificial means to cause more rapid cooling, the latter being preferred to save time.

At this point the gas chamber contains a considerable excess of the gas admitted for inflating the rubber, and this excess is drawn off slowly and stored in ether vats through a chalk separator for subsequent use. When the gas has all been withdrawn, the container with the rubber is removed from the gassing chamber.

At this time, as stated above, the rubber has been only partially vulcanized and has not yet been fully expanded to its maximum possibilities. Complete vulcanization and final expansion of this rubber material must be accomplished within twenty-four hours, in order to prevent loss of gas in the partly vulcanized rubber.

For the final vulcanization of the rubber, it is placed in a mold whose inner dimensions and shape are exactly the same as the external dimensions and shape of the desired article. This is then subjected to a further high temperature of heat, preferably steam, at from sixty to one hundred twenty pounds pressure, the time of application varying, in accordance with the size of the molded material, anywhere from twenty-five minutes to twenty-three hours.

The end product of this process is a rubber which is spongy and inflated with a gas at high pressure and temperature until it expands and assumes a minute cellular structure, the cells of which are filled with the injected gas and a suitable preservative. A seal composition has been added which imprisons the occluded gases in the pores or cells or interstices after the pressure and heat have been removed.

The resulting product we have found has considerable strength and durability and yet is extremely light, its weight varying from two and one-half to five pounds per cubic foot, depending upon the pressure and temperature treatment given as cited above and upon the cellular seal provided in a manner which is now well known in the art.

As described hereinbefore, the rubber must be heated to a relatively high temperature. As is well known by those skilled in the art of refrigeration, coating applied to the surfaces of the refrigerator walls is baked to provide a strong bond. This baking operation can be accomplished as part of the process for the final vulcanization and expansion of the rubber described above. It will be understood that in this process, the rubber, when the vulcanization is completed, has been expanded until it occupies the entire space 8 between the inner and outer walls.

As described in the above, a gas is introduced into the air-exhausted rubber at a high pressure. We have discovered that we can control the insulation coefficient of the inflated rubber by the extent of inflation controlled by the pressure and heat applied, and also by the gas used in the inflation process. Thus we preferably use heavier gases such as carbon dioxide.

In Figures 5 and 6 we have shown pipe lines 11 covered with our preferred insulation 12 which may be molded in sections and then secured as by straps 14.

Similarly, our insulation may be used for insulating the walls of buildings to provide both heat and sound insulation.

It will be obvious from the above that our insulation has numerous applications and we do not wish to be limited by the specific illustrations herein given except as set forth in the appended claims.

We claim:

1. In combination, a refrigerator door having an outer wall coated with baked enamel and an inner wall forming a space therebetween and a hard rigid molded sealed cell expanded rubber composition molded to the walls and having the characteristics resulting from molding and vulcanizing the rubber within said walls, said composition having a final vulcanizing temperature substantially equal to the enamel baking temperature.

2. A finished refrigeration unit comprising an insulation chamber and a closed cell inert gas expanded thermoset cured rubber insulating element contained therein, said expansion and curing of the rubber effecting a bond between the inner surface of the chamber and the expanded rubber.

3. A finished refrigeration unit comprising an insulation chamber and a closed cell inert gas expanded thermoset cured rubber insulating element contained therein, said expansion and curing of the rubber effecting a bond between the inner surface of the chamber and the expanded rubber, said expanded rubber having a weight on the order of 5 lbs. per cubic foot.

DUDLEY ROBERTS.
FREDERICK WILLIAM PEEL.